United States Patent Office 3,707,464
Patented Dec. 26, 1972

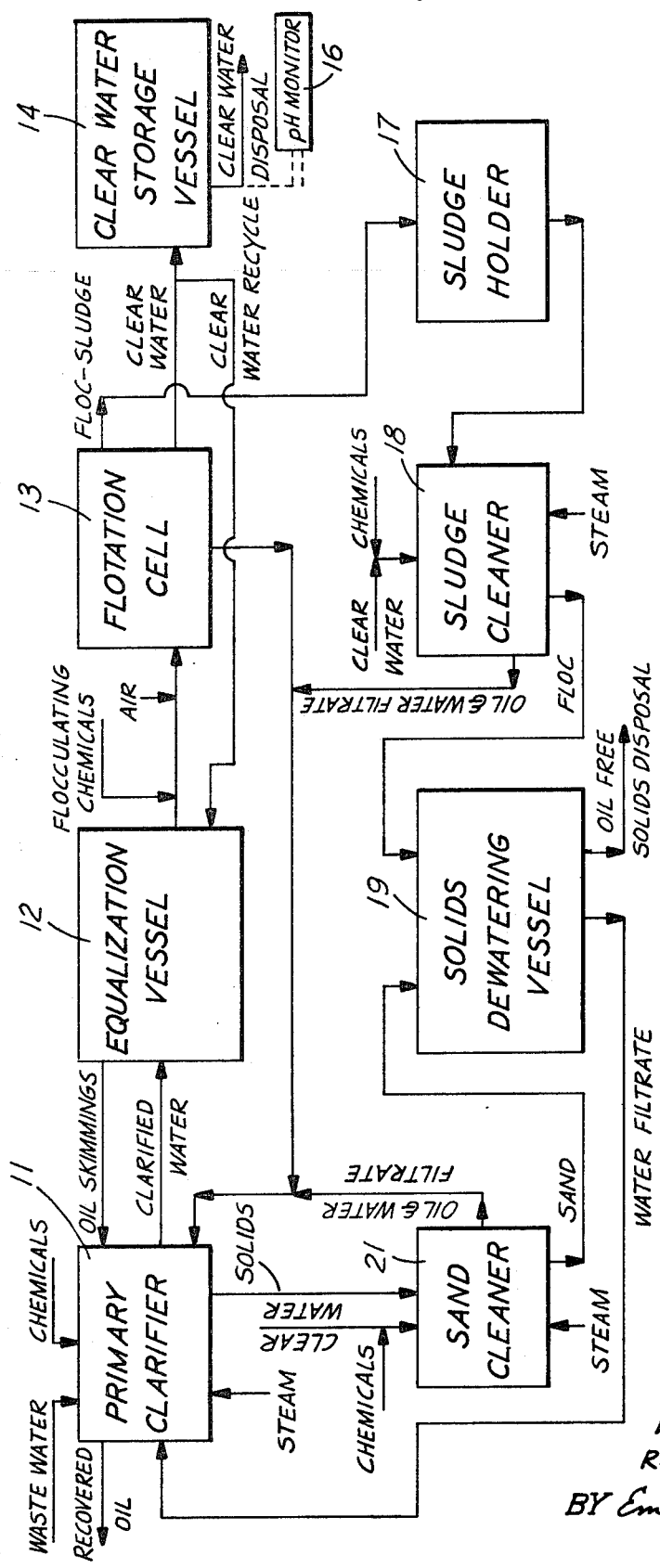

3,707,464
PROCESS FOR CLARIFYING AN OIL-SOLIDS CONTAMINATED AQUEOUS STREAM
William F. Burns and Robert B. Martin, Houston, Tex., assignors to Petrolite Corporation, St. Louis, Mo.
Filed July 15, 1971, Ser. No. 163,184
Int. Cl. B01d 17/02
U.S. Cl. 210—44                                              11 Claims

ABSTRACT OF THE DISCLOSURE

A process for clarifying an oil-solids contaminated aqueous stream such as may arise from the operation of a railroad equipment servicing facility. A primary clarifier gravitationally separates the stream into settled solids, a merchantable oil product and a clarified water stream. The clarified water stream is treated by creating a flocculation product for removing solids and oil therefrom to produce a clear water stream delivered to a subsequent utilization. Settled solids may be returned to the primary clarifier. The flocculation product is accumulated in a sludge cleaner to be periodically converted into water and oil phases. The oil phase is returned into the primary clarifier. The water phase is reformed into an oil-free flocculation product and separated from a water filtrate returned into the pimary clarifier. Solids from the primary clarifier are accumulated in a sand cleaner to be periodically cleaned to separate oil-free solids from a solids-free water-continuous filtrate returned to the primary clarifier. The reformed flocculation product and oil-free solids are separated in a solids dewatering vessel from a water filtrate returned into the primary clarifier. The relatively water-free solids are then delivered to a subsequent utilization such as land fill.

BACKGROUND OF THE INVENTION

(1) Field of the invention

This invention relates to liquid purification and separation; and its relates particularly, to a pollution abatement process for the removal of dispersed oil and solids from a contaminated water stream.

(2) Description of the prior art

Responsible industries have striven to purify various aqueous streams which are contaminated by suspended oil and solids before these streams are discharged into public water courses. Many of these aqueous streams are very difficult to purify to the degree required by pollution abatement regulations. Also, complex purification processes may be required before the aqueous stream can be discharged into various water courses, or other utilizations, without carrying an excessive degree of contamination. These procedures, irrespective of the high degree of purification required of the aqueous stream, must be economically feasible for use in industry.

Serious and expensive difficulties in pollution abatement processes arise in the separation of sand (and other solids) from an aqueous stream when the solids are coated at least in part with oil. These solids, as a mixture of both clean and oil-coated particles, are handled together as a single treatment entity in conventional processes. For example, these solids may be separated by gravitational effects, water washed and then dried in an attempt to clean the solids to a sufficient degree for land fill. In a like manner, other solids are removed by dissolved-air flotation to produce a flocculation product which includes solids intermingled with oil. In may instances, the flocculation products are combined with oil-coated solids separated by gravitational effects from the aqueous stream. The chemistry of these solids from two variant sources is sufficiently different that the same treatment procedure which produces an oil-free sand from a gravity settler will not produce oil-free solids from the flocculation product. As a result, these solids disposed in land fills contains sufficient oil to create objectionable release of oil in the form of "rainbows" on ground waters.

The sand and flocculation product solids from a pollution abatement process may be handled separately with isolated and non-coacting steps to produce oil-free solids suitable for land fill or other utilization. However, these divergent steps create additional problems in complication and expense in the process. Therefore, it is the purpose of the present invention to provide a pollution abatement process which can purify an aqueous stream containing dispersed oil and solids wherein the solids separated by gravitational effects and those removed as flotation products are handled separately but by very similar steps so that coaction occurs in function and result. A clean water stream is produced of high purity for any suitable subsequent utilization. Oil-free solids are produced from a combination of sand and flotation product which may be disposed as land fill, or any other utilization, without difficulties associated with residual or entrained oil. Various other step features of the present process will be appreciated in their advantages over prior art procedures.

SUMMARY OF THE INVENTION

In accordance with this invention, there is provided a process for pollution abatement of an aqueous stream containing oil and solids dispersed within a continuous water phase. The aqueous stream is retained in a primary clarifier for a predetermined time period to permit settleable solids and oil to separate by gravity to the lower and upper surfaces thereof, respectively. The separated oil is removed to a subsequent utilization and the clarified water stream is withdrawn from the primary clarifier. The clarified water stream is treated by creating a flocculation product for removing solids and oil therefrom to produce a clear water stream delivered to a subsequent utilization and with the flocculation product being separated from the clear water stream. The flocculation product is accumulated in a sludge cleaner to be periodically subjected to a two-step rectification. The flocculation product, in a first step, is reduced to separate water and oil phases. The oil phase is returned into the aqueous stream being treated in the primary clarifier. In the second step, the water phase is reformed into a now oil-free flocculation product and separated from a water filtrate returned into the aqueous stream being treated in the primary clarifier. The settled solids from the primary clarifier are accumulated in a sand cleaner to be periodically subjected to a cleaning procedure. This procedure produces oil-free solids and a solids-free water filtrate returned into the aqueous stream being treated in the primary clarifier. The reformed flocculation product from the sludge cleaner and oil-free solids from the sand cleaner are passed into a solids dewatering vessel. The solids are separated by gravitational effects from a water filtrate returned into the aqueous stream being treated within the primary clarifier. The relatively water-free solids are delivered to a subsequent utilization.

DESCRIPTION OF THE DRAWING

The drawing is a schematic flow diagram illustrating the various procedural steps of the pollution abatement process of the present invention.

DESCRIPTION OF SPECIFIC EMBODIMENTS

The pollution abatement process of this invention may be employed with any waste water which has dispersed solids, such as sands, clays, and various other solid particles, and dispersed oil, such as engine fuel, lubricating oils and greases produced by various automotive and internal combustion engine servicing operations. One waste water stream especially suited for processing by the steps of this invention is produced by the operation of railroad equipment servicing facilities. Such a waste stream includes the run-off from engine washing, fueling and sanding aprons, diesel shops, round house pit drainage and miscellaneous other water streams released in servicing and maintenance of railroad locomotives and related equipment. These waste streams contain free oil, emulsified oil, sand, silt, grease, carbon and various other solids. Dissolved substances such as lye and other water soluble alkaline, acidic and salt materials may be present as a result of cleaning operation for servicing railroad rolling stock. The resultant waste water stream has a pH of above 10 and can not be merely settled in a hope of providing a sufficiently clear water stream acceptable for disposal in public water systems such as streams and rivers. The present process will be described specifically for processing such a waste stream from a railroad servicing facility but it will be apparent it is equally applicable to other types of waste water streams.

Referring now to the drawing, there is shown a system in a flow diagram schematic for processing the waste water stream. Although various specific structures will be described for carrying out the various steps of the present invention, other structures are available for the practice of the present steps. It is intended that the practice of these steps is not limited to any specific type or kind of processing equipment.

The waste water stream is collected in a common gathering drainage system and is received into a primary clarifier 11. The primary clarifier 11 is a vessel of suitable size in which the waste water can be retained for a predetermined time period to permit the bulk of settleable solids and oil to separate by gravity to the lower and upper water surfaces respectively, and leaving a clarified water stream at a medial horizon. The primary clarifier 11 may be constructed as a concrete lined basin in which the waste water is stored to provide a sufficient residence time, for example twenty-four hours for gravity settling results. The primary clarifier 11 is equipped with mechanisms for removing the surface-accumulating oil and a drag-out conveyor for removing accumulated settled solids. The oil may be sold or used as a fuel in steam generation or other uses.

The waste water entering the primary clarifier 11 may be adjusted to a pH of about 8.0 by the addition of caustic or acid to accelerate gravitational separation of oil and solids. In addition, the waste water may be heated to above about 110° F. to accelerate the desired separation, and good operation occurs at 120° F. However, excessively high temperatures may produce an atmospheric discharge of the lighter constituents from the oil. Heating of the waste water may be provided by any suitable means. In many instances, the waste water contains acid oils, such as phenols. The injection of live steam into the body of waste water produces, at least to some substantial extent, the transfer of phenols from the waste water into the oil phase collecting on the upper surface of the water phase in the primary clarifier 11. Thus, the primary clarifier 11 produces not only an initial separation of oil and solid phases from the product clarified water, but provides for removal of acid oils from the water phase. The solids removed from the primary clarifier 11 are sent to a subsequent treating step in the present process.

The clarified water withdrawn from the primary clarifier 11 is subsequently treated by creating a flocculation product for removing the solids and oil therefrom to produce a clear water stream and the segregated flocculation product. The flocculation product can be produced by the addition of chemical coagulants and aids to promote solids and oil coagulation. This treatment can be practiced in any type of flocculation unit, such as a water clarifier or dissolved-air flotation unit, the latter device being preferred. It is of some operational advantage before creating the flocculation product to pass the clarified water into an equalization vessel 12.

The equalization vessel 12 has a volumetric size in which the clarified water may be accumulated to a volume greater than required to operate continuously the subsequent steps of the present invention for an extended period, which period may be twenty-four hours. In many cases, the amount of waste water may increase significantly during one twenty-four-hour period and yet during the next period may decrease well below the peak rate of flow. For these purposes, the equalization vessel 12 should contain the maximum waste water accumulation during any operating day plus an additional ten percent excess capacity to provide for unexpected residence time, much like that encountered in the primary clarifier 11. As a result, some free oil may yet gravitate to the water surface. Also, the waste water is less likely to fluctuate rapidly in composition. Small quantities of oil are removed from the equalization vessel 12, by a suitable skimming device, and returned to the primary clarifier 11 for ultimate disposal as recovered oil.

The clarified water from the equalization vessel 12 is moved into a dissolved-air flotation cell 13 for further purification. Dissolved-air flotation acts on the clarified water to produce a clear water stream delivered to a subsequent utilization, settled solids and a flocculation product. The flotation cell 13 can be of any suitable construction and many types are available in present day commerce. The flotation cell 13 brings the clarified water into contact with small air bubbles being released from an aqueous solution. In addition, the flotation cell 13 may have a surface-disposed skimming system for removing the resultant flocculation product and a bottom scraper for removing settled solids.

It has been found that the addition of certain chemicals to the clarified water entering the flotation cell 13 produce a far advantageous and superior result than simple air flotation treatment. More particularly, the clarified water from the equalization vessel 12 is intermixed with alum and an organic polyelectrolyte to promote good flocculation in the flotation cell 13. Alum may be used in varied amounts contingent upon the water composition. However, good results have been obtained with alum used in amounts of about 120 p.p.m. The organic polyelectrolyte is of the general type of cationic polyelectrolytes. However, anionic polyelectrolytes (e.g. 5 p.p.m.) may also be added. Usually, the amount of the polyelectrolytes is not critical. The cationic polyelectrolyte may be used in amounts of about 130 p.p.m. for good results. It has been found that the organic polyelectrolytes in the general class of the acetate salts of oxyalkylated polyalkylene polyamines give good results. These polyamines usually have molecular weights approaching 27,000. In addition, the clarified water stream containing the mentioned chemicals is adjusted in pH to between about 8.0 and 8.5 to provide a more stable flocculation product. The clarified water stream in the flotation cell 13 is treated by the myriads of small bubbles released from an aqueous solution in dissolved-air flotation. This treatment produces a surface accumulation of the floating floc-sludge as a flocculation product that contains dispersed oil and some of the solid materials carried in the clarified water. Some of the more dense solids in the clarified water may settle to the lower portions of the flotation cell 13. These settled solids are removed from the flotation cell 13 by the bottom scraper and returned into the waste water being treated in the primary clarifier 11. The clear water produced in the flotation cell is now substantially completely free of any entrained oil and solids. This clear water is acceptable for disposal in public waterways and navigable surface waters, such as rivers. The clear water is delivered at least in part to a clear water storage vessel 14. The storage vessel 14 need not be of a large capacity but merely provide a small reservoir of clear water to be used in other steps of the present process.

In the preferred operation of the flotation cell 13, the clarified water stream containing the various flocculation-producing chemicals is passed through a pressure vessel in which it is contacted with air under 30 to 35 p.s.i.g. As a result, a substantial portion of this air dissolved into the clarified water, which solution is then introduced with a pressure reduction into the flotation cell 13.

An additional organic polyelectrolyte can be introduced into the solution of air dissolved in clarified water to provide a coagulation aid for the flocculation product produced in the flotation cell 13. Various types of organic polyelectrolytes are known as coagulant aids in dissolved-air flotation techniques. Anionic or nonionic polyelectrolytes provide excellent coagulation aids in carrying out the dissolved-air flotation step of this invention. The polyelectrolytes in the general class of polyacrylamide polymers give good results.

The clear water from the flotation cell 13 not contained in the storage vessel 14 is passed to any suitable clear water disposal such as public water courses or rivers. The clear water passed to disposal can be monitored with a pH monitor 16 which ensures a proper operation in the various process steps. For example, the clear water may be sent safely to any suitable disposal while it has a pH of between 6.5 and 8.5. A pH indication by the monitor 16 outside of this range indicates a malfunction in the steps of the present process. Then, the monitor 16 may activate suitable alarms and interlock controls to shutdown the pumps feeding clarified water into the flotation cell 13. Other automatic alarm features may be provided, if desired, for controlling other of the process steps.

The flotation product from the flotation cell 13 is in the form of a floc-sludge produced in relatively small amounts but continuously. The flotation product contains dispersed oil and solids in sufficient amounts to require subsequent treatment. The flotation product is conveyed continuously into a sludge holder 17 until a sufficient amount is collected for efficient treatment. The capacity of the sludge holder 17 usually will contain the flocculation product produced by the flotation cell 13 in a twenty four hour period. The accumulated flocculation product in the sludge holder 17 is periodically introduced into a sludge cleaner 18.

The sludge cleaner 18 is preferably a steel vessel with various phase outlets. The flocculation product is intermixed with various chemicals and heated during the performance of certain steps of the present process in the cleaner 18. More particularly, the flocculation product introduced into the sludge cleaner 18 is subjected to a two step rectification. In the first step of rectification, the flocculation product is reduced to separate water and oil phases. The oil phase is returned into the aqueous stream being treated in the primary clarifier 11. In the second step, the water phase is treated with chemicals to produce a reconstituted flocculation product that is oil-free. The newly-formed flocculation product is separated from a resultant water filtrate. The water filtrate is returned into the aqueous stream being treated in the primary clarifier 11. The reformed flocculation product is then sent to subsequent treatment in the present process.

More particularly in the first rectification step, the flocculation product in the sludge cleaner 18 is first mixed with an acid (e.g., sulfuric acid) until the mixture is reduced to a pH of about 2. The acidified mixture is preferably heated to an elevated temperature, which may be about 140° F. The treated mixture produces a reduction of the flocculation product into alum dissolved in an acidified water phase and an oil phase. After mixing is terminated, the oil phase separates and it is returned into the aqueous stream being treated in the primary clarifier 11. Next, the oil-free acidic water phase is adjusted to a pH of about 8 by addition of a small amount of caustic. A short period of intimate mixing and heating reforms an oil-free flocculation product. The reformed flocculation product, upon termination of mixing, separates from a water filtrate which is returned into the aqueous phase being treated within the primary clarifier 11. The flocculation product is now transferred to a solids dewatering vessel 19.

Preferably, a chemical surfactant is added while the flocculation product is acidified and heated in the sludge cleaner 18. The surfactant promotes the thorough removal of the oil phase from the acidic water phase and alum produced in the first step of rectification. Various surfactants are known to be useable for this purpose. One surfactant class that has produced good results is the ammonium salts of sulfated oxyalkylated fatty alcohols.

The dewatering vessel 19 may be a concrete-walled container having an inclined bottom surface upon which solids are spread to be freed of excess of water by drainage. The vessel 19 preferably has an inclined sand surface resting upon an underdrain plate through which the water drains from the solids. Periodically, the solids are scraped from the sand surface when substantially dry. Since these dewatered solids have little residual chemicals and are oil-free, they can be disposed safely in land fill or other utilization without creating pollution problems.

In the present process, the treatment of solids removed from the primary clarifier 11 resembles the treatment of flocculation product in the sludge cleaner 18. The solids removed from the primary clarifier 11 are passed to a sand cleaner 21. The sand cleaner 21 may have the same construction as the sludge cleaner 18. The solids from the sludge cleaner 18 and sand cleaner 21 can not be combined for simultaneous treatment. The sludge cleaner 18 could be used for treatment of these solids but this would require careful timing of the treatment steps. The solids entering the sand cleaner 21 are intermixed with a small quantity of clear water from the clear water storage 14. Various chemicals are added in a cleaning procedure to separate oil-free solids from a solids-free water filtrate which is returned into the aqueous stream being treated in the primary clarifier 11.

More particularly in the sand cleaner 21, the solids are intermixed with a small quantity of clean water, a surfactant and sufficient caustic to adjust the mixture to a pH of about 12. The surfactant may be the same as used in the sludge cleaner 18 and makes the sand-solids water-wetted. Preferably, the mixture is heated to above about 140° F. The mixture is heated and mixed until there is formed an oil-in-water emulsion from which oil-free solids separate on termination of the mixing. The solids-free water filtrate is returned into the aqueous stream being treated within the primary clarifier 11. The oil-free solids, namely sand, is passed into the solids dewatering vessel 19. These solids may be processed therein conjunctively with or separately from, the flocculation product from the sludge cleaner 18. The operation of the sand cleaner 21 can be periodic. For example, the solids from the primary clarifier 11 are accumulated in the sand cleaner 21 during a twenty four hour period and then treated in a single operation.

It will be apparent that the periodic cleaning of solids from the sludge cleaner 18 and sand cleaner 21 are more amenable to batch operations in certain steps of the present process since a continuous operation would require complicated process controls or excessive manual operations. The solids removed from the primary clarifier 11 and the flocculation product produced by the flotation cell 13 have relatively different chemical and physical properties. Thus, simultaneous treatment of these solids in a single cleaner, either the sand cleaner 21 or the sludge cleaner 18, would produce unacceptable results. For example, the solids entering the sand cleaner 21 are oil coated. The flocculation product produced by the flotation cell 13 has oil emulsified in a chemical floc. Obviously, a combined treatment by the steps practiced in either the sludge cleaner 18 or the sand cleaner 21 can not produce oil-free solids. More particularly, subjecting the oil-coated solids from the primary clarifier 11 to the steps practiced in the sludge cleaner 18 would produce an emulsification of the oil-coated solids into an acidified water phase. Conversely, treatment of the flocculation product in the sand cleaner 21 (by the steps practiced therein) would result in the chemical floc carrying dispersed oil being emulsified into the oil-in-water emulsion filtrate returned to the primary clarifier 11. Thus, the desired results of the steps could not be obtained.

The flow of waste water entering the primary clarifier 11 could be terminated for an extended period of time. In this situation, the flotation cell 13 would operate until the supply of clarified water in the equalization vessel 12 was depleted. Better operation in the present process dictates that the flotation cell 13 be operated on a continuous basis to avoid a startup on a relatively small amount of clarified water of highly variable composition produced during initial operation of the primary clarifier 11. For this purpose, the clear water stream from the flotation cell 13 can be returned in full recycle directly into the equalization vessel 12. In such arrangement, the clarified water in the equalization vessel 12 is slowly intermingled with the clear water recycle. Therefore, the water entering the flotation cell 13 gradually changes toward the clear water in composition. Restoration of waste water flow into the primary clarifier 11 cannot produce a sudden change in composition of the clarified water passing from the equalization vessel 12 into the flotation cell 13.

It will be recognized that the operation of the sludge cleaner 18 and the sand cleaner 21 is upon a periodic basis. In this regard, the operation of the solids and oil removal devices on the primary clarifier 11 may also be on a periodic basis. For example, a clock controller can operate these various removal devices so that the recovered oil, solids and flocculation product are removed into a sales oil tank, the sludge cleaner 18, the sand cleaner 21 and into the sand solids drying bed 19 in timed sequence to the process function performed in these devices.

The parallel treatment steps practiced in the sludge cleaner 18 and the sand cleaner 21 produce oil-free solids which can be dewatered simultaneously in the solids dewatering vessel 19. Conversely, these steps also produce an aqueous phase returned into the primary clarifier 11 for subsequent treatment. The amount of water filtrates returned to the primary clarifier 11 is in such small amounts that it does not influence the operation of the other steps of the present process. For example, a waste water stream of approximately 100,000 gallons per day produces water filtrate removed from the sludge cleaner 18 and the sand cleaner 21 in an amount not over 1,000 gallons per day. Thus, only a very small portion of the total water is recirculated through the process steps.

The present process, practiced in accordance with the described preferred mode of operation, provided outstanding purification of a waste water stream of 100,000 gallons per day from a railroad equipment servicing facility. The waste water and clear water streams were sampled and composited for a twenty four hour period. The following data were obtained on these composited samples:

STEAM COMPOSITE ANALYSIS

|  | Waste water | Clear water |
|---|---|---|
| pH | 10.1 | 8.2 |
| Total alkalinity | 222 | 151 |
| Hydroxyl alkalinity, p.p.m | 98 | 0 |
| Carbonate alkalinity, p.p.m | 21 | 22 |
| Bicarbonate alkalinity, p.p.m | 113 | 122 |
| Calcium, p.p.m | 24 | 22 |
| Magnesium, p.p.m | 3 | 4 |
| Iron, p.p.m | 29 | 2 |
| Chromates, p.p.m | 1.2 | 0.05 |
| Chlorides, p.p.m | 54 | 57 |
| Sulfates, p.p.m | 32 | 94 |
| Phosphates, p.p.m | 4.2 | 1.9 |
| Total solids, p.p.m | 2,250 | 629 |
| Total suspended solids, p.p.m | 1,830 | 13.0 |
| Total dissolved solids, p.p.m | 420 | 616 |
| Oil, p.p.m | 3,250 | 15 |
| Phenol, p.p.m | 1.2 | 0.03 |
| Aluminum, p.p.m | Trace | 0.9 |
| COD, p.p.m | 285 | 211 |
| Settleable solids, ml./l | 0.30 | Nil |

The data shows outstanding reductions in total oil, suspended solids and phenol by the present process. The clear water stream was accepted under State and Federal Regulations for discharge into a navigable river.

From the foregoing description, and examples of specific embodiments of this invention, it will be apparent that a novel procedure has been described for pollution abatement of a waste water containing dispersed oil and solids. Various changes and modifications may be made to the steps of this process without departing from the spirit of the invention. It is intended that such changes and modifications fall within the scope of the appended claims. The present description is intended to be for illustration of the present invention.

What is claimed is:

1. A process for pollution abatement of an aqueous stream containing oil and solids dispersed within a continuous water phase comprising the steps of:
   (a) retaining the aqueous stream in a primary clarifier for a predetermined time period to permit settleable solids and oil to separate by gravity to the lower and upper surfaces thereof, respectively, removing the separated oil to a subsequent utilization and withdrawing a clarified water stream;
   (b) treating the clarified water stream by creating a flocculation product for removing solids and oil therefrom to produce a clear water stream delivered to a subsequent utilization, and the flocculation product being separated from the clear water stream;
   (c) accumulating the flocculation product in a sludge cleaner and periodically subjecting same to a two step rectification, in the first step reducing the flocculation product to separate water and oil phases, and returning the oil phase into the aqueous stream being treated in the primary clarifier, and in the second step, reforming a now oil-free flocculation product, and separating same from a water filtrate returned into the aqueous stream being treated in the primary clarifier;
   (d) accumulating in a sand cleaner the settled solids from the primary clarifier, and periodically subjecting same to a cleaning procedure producing oil-free solids and a solids-free water filtrate returned into the aqueous stream being treated in the primary clarifier; and
   (e) passing the reformed flocculation product from the sludge cleaner and oil-free solids from the sand cleaner into a solids dewatering vessel wherein by gravitational effects the solids are separated from a water filtrate returned into the aqueous stream being treated within the primary clarifier and the resultant relatively water-free solids are delivered to a subsequent utilization.

2. The process of claim 1 wherein in step (a) the aqueous stream is heated to above about 110° F. and the pH of the aqueous stream is adjusted to about 8.0 to accelerate the separation of settleable oil and solids from the clarified water stream.

3. The process of claim 1 wherein in step (b) the clarified water stream from the primary clarifier is intermixed with alum and organic polyelectrolyte and the pH of the clarified water stream is adjusted to between about 8.0 to 8.5 to provide good flocculation, and then this clarified water stream mixture is subjected to dissolved-air flotation to produce the separation of settled solids and floating flocculation product from the clear water stream.

4. The process of claim 3 wherein in step (c) the flocculation product from the flotation cell is acidified to a pH sufficient to reduce the flocculation product into an alum and an acidified water phase, and a free oil phase which is returned into the aqueous stream being treated in the primary clarifier, and then the oil-free water phase is adjusted with a base to a pH sufficient to reform a now oil-free flocculation product, and separating same from a water filtrate returned into the aqueous phase being treated in the primary clarifier.

5. The process of claim 4 wherein the flocculation product is acidified to a pH of about 2 to reduce the fluocculation product into separated oil and acidified water phases, and then the oil-free alum and acidified water from the fluocculation product are made basic to a pH of about 8 to reform a now oil-free flocculation product.

6. The process of claim 1 wherein the step (d) the solids accumulated in the sand cleaner are subjected to a cleaning procedure in which the oil and water associated with these solids are converted into an oil-in-water emulsion, and then the emulsion is separated from a now oil-free solids and the resultant emulsion is returned into the aqueous stream being treated in the primary clarifier.

7. The process of claim 6 wherein the solids in the cleaning procedure are mixed with clarified water and a surfactant, and this fluid mixture is adjusted to a pH of about 12 to form an oil-in-water emulsion from which oil-free sand settles after mixing is completed.

8. The process of claim 7 wherein the fluid mixture is heated to a temperature above about 140° F. while being mixed.

9. The process of claim 1 wherein in step (a) the aqueous stream in the primary clarifier is heated to a temperature above about 110° F. and the pH of the aqueous stream is adjusted to about 8.0 to accelerate the separation of settleable oil and solids, and the aqueous stream is headed directly with steam whereby acid oils such as phenols are transferred from the water phase into the separated oil phase.

10. A process for pollution abatement of an aqueous stream containing oil and solids dispersed within a continuous water phase, which stream may arise from operation of a railroad equipment servicing facility, comprising the steps of:

(a) retaining the aqueous stream in a primary clarifier for a predetermined time period while being heated to a relatively mild elevated temperature above about 110° F. and with the pH of the aqueous stream adjusted to about 8.0 to accelerate the separation of settleable oil and solids, the oil and solids separating by gravity to the upper and lower surfaces in the primary clarifier, respectively, and removing the oil to a subsequent utilization and withdrawing a clarified water stream;

(b) intermixing the clarified water stream with alum and an organic polyelectrolyte and adjusting the pH of the clarified water stream to between about 8.0 and 8.5 to provide good flocculation and then, the clarified water stream mixture is subjected to dissolved-air flotation to produce the separation of a clear water stream delivered to a subsequent utilization, settled solids returned into the aqueous stream being treated in the primary clarifier and a flocculation product removed from the water surface in dissolved-air flotation;

(c) accumulating the flocculation product and some clear water in a sludge cleaner and subjecting same to a periodic first cleaning procedure by adjusting the pH of the liquid to about 2 to reduce the flocculation product into alum and an acidified water phase, and a free-oil phase which is returned into the aqueous stream being treated in the primary clarifier, and then the oil-free water phase and alum are adjusted to a pH of about 8 to reform a now oil-free flocculation product, and separating same from a water filtrate returned into the aqueous phase being treated in the primary clarifier;

(d) accumulating in a sand cleaner the settled solids from the primary clarifier and subjecting these solids to a periodic cleaning procedure wherein these solids are mixed thoroughly with clarified water, a surfactant and with the pH of the mixture adjusted to about 12, and the mixture is heated to above about 140° F. while being mixed until an oil-in-water emulsion is formed from which an oil-free sand settles upon completion of the mixing, and the solids-free water filtrate is returned into the aqueous stream being treated in the primary clarifier; and (e) passing the reformed oil-free flocculation product from the sludge cleaner and oil-free solids from the sand cleaner into a solids dewatering vessel wherein by gravitational effects the solids are separated from a water filtrate returned into the aqueous stream being treated within the primary clarifier and the resultant relatively water-free solids are delivered to a subsequent utilization.

11. A process for pollution abatement of an aqueous stream containing oil and solids dispersed within a continuous water phase comprising the steps of:

(a) retaining the aqueous stream in a primary clarifier for a predetermined time period to permit settleable solids and oil to separate by gravity to the lower and upper surfaces thereof, respectively, removing the separated oil to a subsequent utilization and withdrawing a clarified water stream;

(b) treating the clarified water stream by creating a flocculation product for removing solids and oil therefrom to produce a clear water stream delivered to a subsequent utilization and the flocculation product removed from the clear water stream;

(c) accumulating the flocculation product in a sludge cleaner and periodically subjecting same to a two step rectification, in the first step reducing the flocculation product to separate water and oil phases, and returning the oil phase into the aqueous stream being treated in the primary clarifier, and in the second step, reforming a now oil-free flocculation product, and separating same from a water filtrate returned into the aqueous stream being treated in the primary clarifier;

(d) accumulating in a sand cleaner the settled solids from the primary clarifier, and periodically subjecting same to a cleaning procedure producing oil-free solids and a solids-free water filtrate returned into the aqueous stream being treated in the primary clarifier; and (e) passing the reformed flocculation product from the sludge cleaner and oil-free solids from the sand cleaner into a solids dewatering vessel wherein by gravitational effects the solids are separated from a water filtrate returned into the aqueous stream being treated within the primary clarifier and the resultant relatively water-free solids are delivered to a subsequent utilization.

References Cited

UNITED STATES PATENTS

| | | | |
|---|---|---|---|
| 3,347,786 | 10/1967 | Baer et al. | 210—61 X |
| 3,414,523 | 12/1968 | Jockel | 252—324 |
| 3,446,732 | 5/1969 | Gasser et al. | 210—44 |

OTHER REFERENCES

American Petroleum Institute, Manual on Disposal of Refinery Wastes, vol. VI, solid wastes, 1963, first ed., pp. 11 and 21.

MICHAEL ROGERS, Primary Examiner

U.S. Cl. X.R.

210—60, 66, 73, 83; 252—324

UNITED STATES PATENT OFFICE
CERTIFICATE OF CORRECTION

Patent No. 3,707,464          Dated     December 26, 1972

Inventor(s)   William F. Burns and Robert B. Martin

It is certified that error appears in the above-identified patent and that said Letters Patent are hereby corrected as shown below:

Column 2, line 6, for "may" read --- many ---;
Column 6, line 23, for "inuto", read --- into ---; and
Column 8, line 24, in the table, right hand column, second line from the bottom, for "2il", read --- 27 ---.

Signed and sealed this 22nd day of May 1973.

(SEAL)
Attest:

EDWARD M. FLETCHER, JR.
Attesting Officer

ROBERT GOTTSCHALK
Commissioner of Patents